(12) United States Patent
Tin

(10) Patent No.: US 7,702,146 B2
(45) Date of Patent: Apr. 20, 2010

(54) COLOR CHARACTERIZATION USING COLOR VALUE CLIPPING

(75) Inventor: Siu-Kei Tin, Milpitas, CA (US)

(73) Assignees: Canon Kabushiki Kaisha, Tokyo (JP); Microsoft Corporation, Redmond, WA (US)

( * ) Notice: Subject to any disclaimer, the term of this patent is extended or adjusted under 35 U.S.C. 154(b) by 1050 days.

(21) Appl. No.: 10/840,089

(22) Filed: May 6, 2004

(65) Prior Publication Data

US 2005/0249407 A1    Nov. 10, 2005

(51) Int. Cl.
*G06K 9/00*    (2006.01)
(52) U.S. Cl. .................................................. 382/162
(58) Field of Classification Search ................ 382/167
See application file for complete search history.

(56) References Cited

U.S. PATENT DOCUMENTS

| | | | | |
|---|---|---|---|---|
| 5,416,890 | A * | 5/1995 | Beretta | 345/590 |
| 5,539,540 | A * | 7/1996 | Spaulding et al. | 358/518 |
| 6,069,973 | A * | 5/2000 | Lin et al. | 382/167 |
| 6,181,445 | B1 * | 1/2001 | Lin et al. | 358/520 |
| 6,384,918 | B1 * | 5/2002 | Hubble et al. | 356/402 |
| 6,424,740 | B1 * | 7/2002 | Giorgianni et al. | 382/167 |
| 6,665,434 | B1 * | 12/2003 | Yamaguchi | 382/162 |
| 6,950,109 | B2 * | 9/2005 | Deering | 345/589 |
| 7,012,633 | B2 * | 3/2006 | Jenkins | 348/180 |
| 7,020,331 | B2 * | 3/2006 | Saikawa et al. | 382/167 |
| 7,268,757 | B2 * | 9/2007 | Ben-David et al. | 345/88 |

OTHER PUBLICATIONS

Color device calibration: a mathematical formulation, Vrhel, M.J.; Trussell, H.J.; Image Processing, IEEE Transactions on,vol. 8, Issue 12, Dec. 1999 pp. 1796-180.*

D. J. Littlewood et al., "Pareto-Optimal Formulations for Cost versus Colorimetric Accuracy Trade-Offs in Printer Color Management", ACM Transactions on Graphics, vol. 21, No. 2, Apr. 2002, pp. 132-175.

Hunt, R.W.G., *Measuring Colour*, 3rd Ed., 63-68, Fountain Press, 1998.

Press, W.H. et al., *Numerical Recipes in C: The Art of Scientific Computing*, 2nd Ed., Cambridge University Press, pp. 681-688, 1993.

Shepard, D., "A two-dimensional interpolation function for irregularly spaced data", Proceedings of the 23rd ACM Natl. Conf., pp. 517-524, 1968.

(Continued)

*Primary Examiner*—Yuzhen Ge
(74) *Attorney, Agent, or Firm*—Fitzpatrick, Cella, Harper & Scinto

(57) ABSTRACT

A method for correcting a color value generated by a forward model for a color input device. A color value generated by the forward model is mapped into a color space. The color value is clipped to a locus of a visual gamut in the color space if the color value falls outside of the visual gamut. Clipping the mapped color value ensures that the color input device generates color values that represent colors within the human visual system. Clipping may be accomplished by clipping a color value to an intersection of a locus boundary and a vector between the color value and a white point. The locus used may be the CIE spectral locus projected into the color space. Any number of standard color spaces may be used in the method, such as CIEXYZ, CIELUV, or CIELAB.

24 Claims, 5 Drawing Sheets

OTHER PUBLICATIONS

Kang, H.R., "Color scanner calibration", *J. Imag. Sci. Tech.*, 36, pp. 162-170, 1992.

Kang, H.R., *Color Technology for Electronic Imaging Devices*, SPIE, pp. 272-294, 1997.

Draper, N.R. et al., *Applied Regression Analysis*, 3rd Ed., Wiley-Interscience, pp. 251-271, 1998.

* cited by examiner

COLOR CHARACTERIZATION USING COLOR VALUE CLIPPING

BACKGROUND

1. Field of the Invention

The present invention generally relates to characterization of color devices and more particularly to correction of a color input device's forward model.

2. Description of the Related Art

In order to mimic the human visual system, color input devices used to sense colors represent colors using three colors of light, namely Red, Green, and Blue (RGB). By measuring varying intensities of these three colors of light, color input devices can simulate the human perception of a variety of colors. For example, a color input device, such as a document scanner, uses light sensors to measure the intensity of red, green, and blue light reflected from an object. The light intensities are then used to represent colors as RGB color values in the color input device's own device dependent RGB color space.

A forward model maps RGB color values received from the color input device into a device independent color space. This allows use of a color input device's color values by other color devices through the use of a common Color Management Module (CMM). A possible problem with forward models of input devices is that the output of the model may not always be physically meaningful, i.e., they might not define colors that lie within the human visual gamut as determined by the CIE. The cause of this is the fact that the building blocks of the model, such as monomials or other basis functions, are general mathematical objects and not particularly color science savvy. As such, the values they produce are not constrained to represent colors that are visible to the human observer. This problem may become exacerbated when the forward model is used to extrapolate colors for RGB values not in the original training sampled data.

Therefore, a need exists for a method to ensure a forward model for a color device generates physically meaningful color values. Various aspects of the present invention meet such a need.

SUMMARY OF THE INVENTION

The present invention addresses the need by correcting a color value mapped by a forward model from a color input device through clipping to the human visual gamut.

Thus, in one aspect, a mapped color value is generated by a forward model of a color input device which maps color values from a device dependent color space to a device independent color space. The mapped color value is corrected by clipping the color value to a boundary of a visual gamut in the device independent space. Clipping the mapped color value ensures that the color input device generates color values that represent colors within the human visual system.

In preferred aspects, clipping is performed by projecting the mapped color value towards a white point at the same luminance value as that of the mapped color value. The mapped color value is clipped to a point on the visual gamut boundary where the projection meets the visual gamut boundary.

Preferably, luminance is allowed to exceed the luminance of the white point, to accommodate mapped color values that represent specular reflection.

The forward model is preferably based on low-order polynomials (such as polynomials of degree 3 or less) that perform the mapping from a device dependent color space (such as RGB) to a device independent space (such as CIELUV, CIELAB, Jab space of CIECAM). The boundary of the visual gamut is preferably that defined by the CIE spectral locus as defined in CIE 15.2-1986 and transformed into the device independent color space.

In another aspect, the luminance value of the color value is clipped at a lower bound.

In another aspect, clipping the color value further includes determining at the clipped luminance value a locus of the visual gamut on a chromaticity plane. A vector is determined from a chromaticity of the white point to the chromaticity value at the clipped luminance value. The chromaticity value is then clipped to an intersection of the vector and the locus if the vector intersects the locus.

This brief summary has been provided so that the nature of the invention may be quickly understood. A more complete understanding of the invention may be obtained by reference to the following detailed description in connection with the attached drawings.

DETAILED DESCRIPTION

Figure 1:
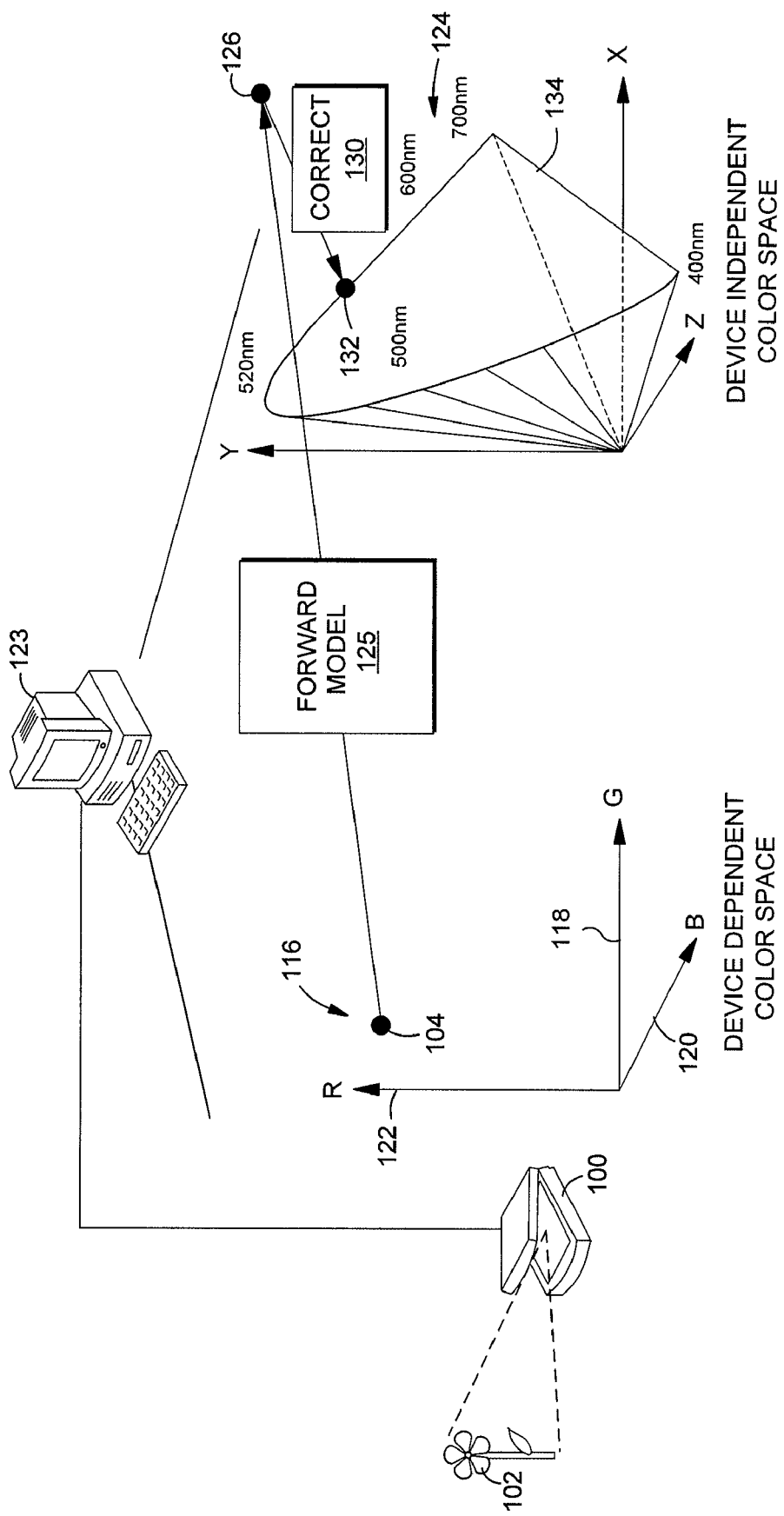
FIG. 1 is a block diagram depicting generating a device dependent color value in response to a color target by a color input device and mapping the device dependent color value into a device independent color space using a corrected forward model.

FIG. 1 is a block diagram depicting generating a device dependent color value in response to a color target by a color input device and mapping the device dependent color value into a device independent color space using a corrected forward model. A color input device 100, such as a scanner, scans a color target 102 to generate a color value 104 in a device dependent color space 116 that may be unique to the color input device. For a typical color scanning device, the color values may be considered as points in a device dependent three-dimensional color space having red 122, green 118, and blue 120 dimensions. As the three dimensions correspond to RGB values, the device dependent color space is herein termed RGB.

The color input device may be coupled to or include a data processing system 123 that uses the color values generated by the color input device with other color devices. To do so, the data processing system maps the color values into a device independent color space 124 using a forward model 125. The forward model maps the device dependent color value to a device independent color value 126 in the device independent color space. In doing so, the forward model may map the color value in the device dependent color space to a color value that does not represent an actual human perceived color. To correct for this, the data processing system corrects the mapped color value using a color value clipping module 130. The color value clipping module clips the mapped color value 126 to generate a clipped color value 132. The clipped color value is clipped at a boundary of a visual gamut 134 as expressed in the device independent color space.

As depicted above, the color input device is a color scanner. However, any color input device, such as film and reflective color scanners, digital still cameras, digital video cameras, etc., may be characterized using the present invention. In addition, the present invention has been described with respect to color input devices wherein the forward model is used either directly or indirectly in a Color Management System (CMS). However, the present invention may also be applied whenever a color input device is modeled. Such scenarios include, but are not limited to, creating color profiling software that supports scanners and digital cameras. In addition, the choice of a device independent color space is arbitrary. Any standardized color space may be used. For example, the device independent color space may be CIEXYZ, CIELAB, or CIELUV.

Figure 2:
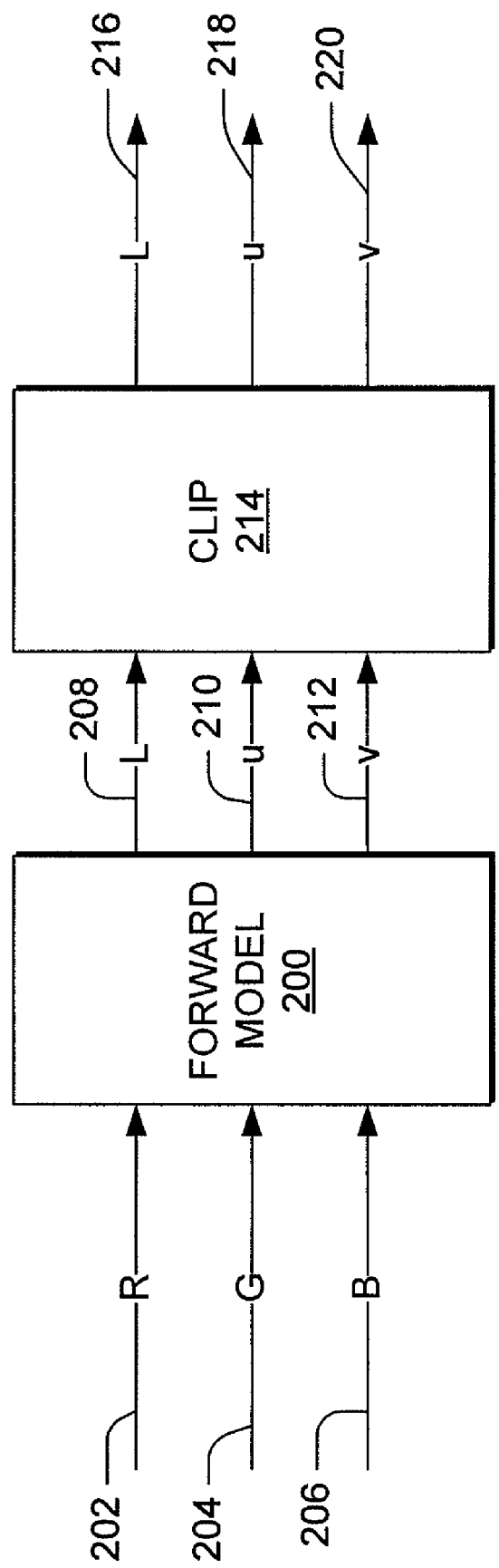
FIG. 2 is a block diagram depicting a corrected forward model.

FIG. 2 is a block diagram depicting a corrected forward model. If the device independent color space is CIELUV, then a forward model 200 for the color input device is a mathematical transformation from RGB to CIELUV that models as accurately as possible the behavior of the color input device. The forward model receives three components of a color value in RGB as R 202, G 204, and B 206 components. In response to the RGB color value, the forward model generates a color value in the device independent color space having L 208, u 210, and v 212 components. The output of the forward model is then received by a correction module 214. In response to the color value in the device independent color space, the correction module ensures that the color value in the device independent color space represents a color value in a visual gamut by clipping the color value to a boundary of the visual gamut. The correction module outputs a corrected mapped color value having corrected L 216, u 218, and v 220 components.

Figure 3:
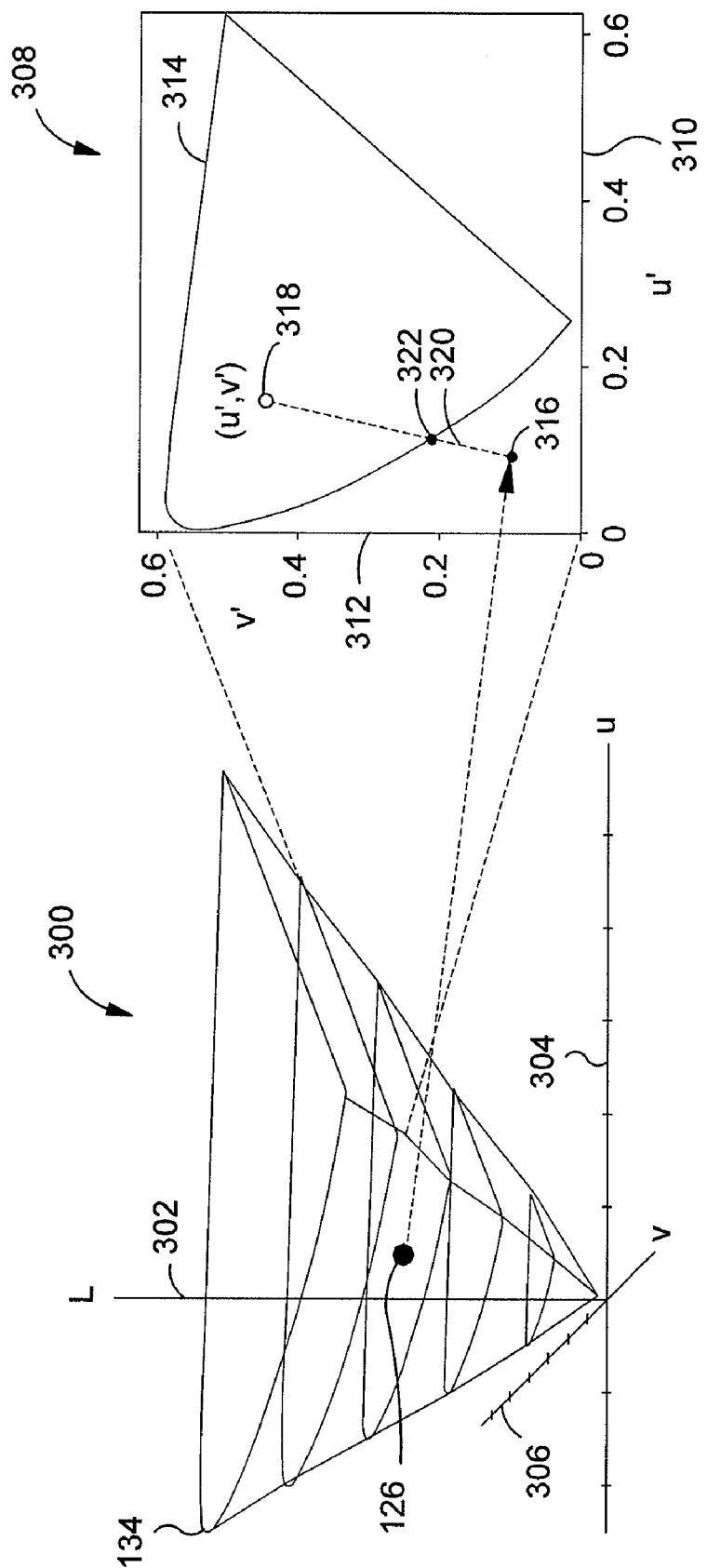
FIG. 3 is a graphical representation of clipping a color value to a visual gamut.

FIG. 3 is a graphical representation of clipping a color value to a visual gamut. In the graphical representation, the example device independent color space used is CIELUV. Objects in CIELUV may be depicted using a three dimensional graph 300 having a L axis 302, an u axis 304, and a v axis 306. A color value's CIELUV L component plotted against the L axis corresponds to a measure of the luminance of the color value. The chromatic component of the color value is represented by u and v values plotted against the u and v axes respectively.

A visual gamut 134 in CIELUV space is represented by a solid that is an inverted pyramid with axis aligned with the L-axis and cross-section tapering to a point as L decreases. The visual gamut may be projected into a chromaticity space 308. In the preferred embodiment of the present invention, the chromaticity space used is the CIE Uniform Chromaticity u'v'. In CIE Uniform Chromaticity u'v', the chromatic components of a color are plotted along a u' axis 310 and a v' axis 312. In the u'v' plane, the boundary of the visual gamut is represented by a locus.

To clip a mapped color value 126 to the visual gamut, a luminance component of the mapped color value is clipped at a lower bound. A chromaticity value 316 is generated for the mapped color value in the chromaticity diagram. A locus 314 of the boundary of the visual gamut on the chromaticity plane is determined. A chromaticity of the white point 318 is also determined. This results in a two dimensional chromaticity diagram having a locus of the visual gamut, a chromaticity value corresponding to the mapped color value, and a chromaticity value of the white point within the locus of the visual gamut.

A vector 320 is determined by projecting from the chromaticity value to the white point. If the color value does not correspond to a physical color, the chromaticity value will fall outside of the locus of the visual gamut. If so, the vector determined above will intersect the locus. A clipped chromaticity value 322 may then be determined from the intersection of the vector and the locus.

Figure 4:
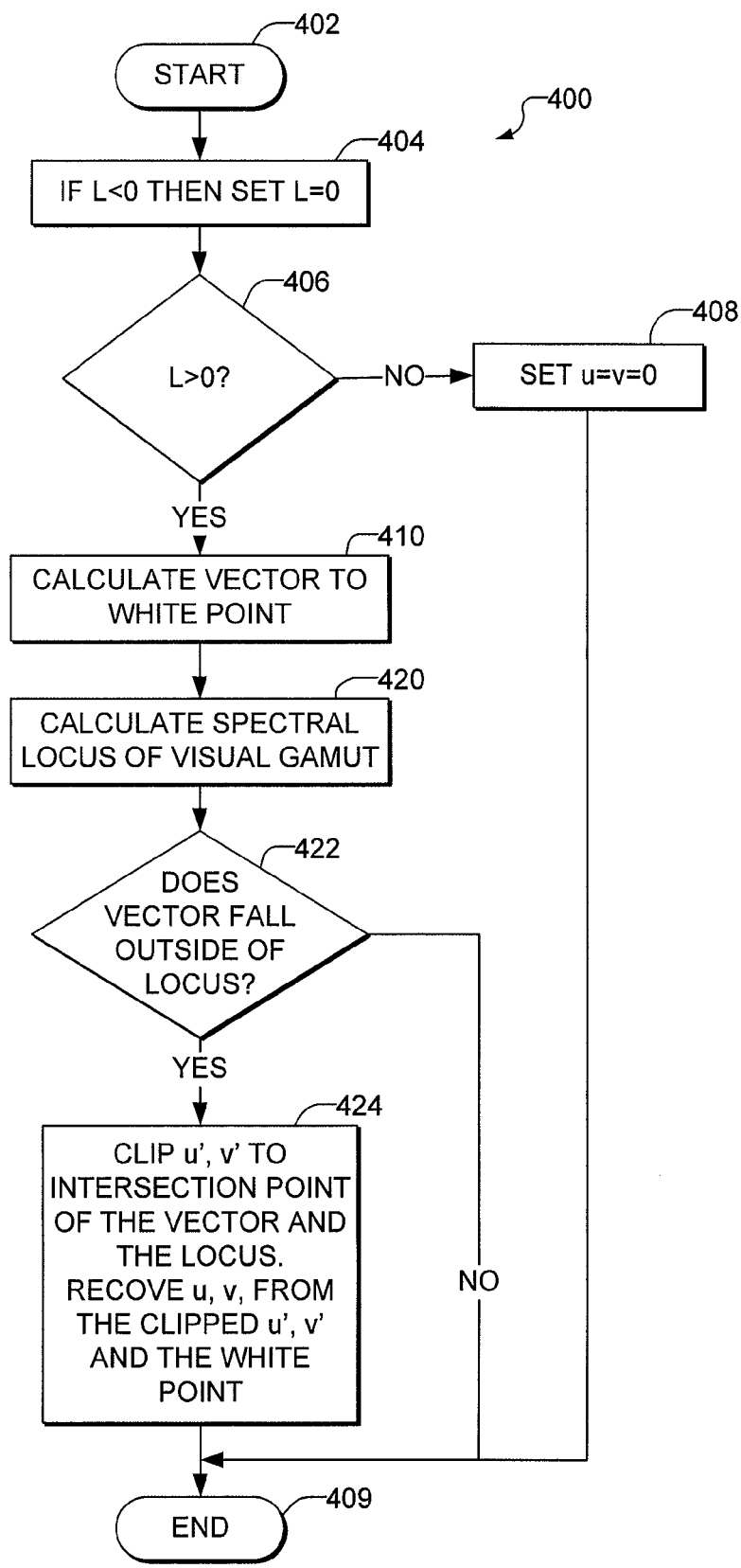
FIG. 4 is a flowchart of a color value clipping process in accordance with the graphical representation of FIG. 3.

FIG. 4 is a flowchart of a color value clipping process in accordance with the graphical representation of FIG. 3. In a preferred embodiment of the invention, CIELUV space is used as the device independent space. To clip a color value (L, u, v) to the visual gamut, a color value clipping process 400 starts 402 by clipping 404 a luminance component of a color value to a non-negative value:

$$L \leftarrow \max(0, L)$$

The luminance component is not clipped at an upper bound for L in the device independent color space to allow extrapolation for specular highlights that may be captured by a color input device for an object.

Next, if L is equal to zero (which may be the result of clipping), set u=v=0 408. The process then terminates 409.

If the luminance value is greater than zero, then components of a vector in the u'v' diagram from the white point, ($u_n'$, $v_n'$) 318 of FIG. 3 to the chromaticity value in question are calculated 410 as follows:

$$u'_{rel} = u/13L$$

$$v'_{rel} = v/13L$$

The spectral locus of the visual gamut is then defined 420 as the convex hull of all the points (u', v') parametrized by the wavelength $\lambda$ in accordance with the following equations $$u'(\lambda) = \frac{4\bar{x}(\lambda)}{\bar{x}(\lambda) + 15\bar{y}(\lambda) + 3\bar{z}(\lambda)}$$

$$v'(\lambda) = \frac{9\bar{y}(\lambda)}{\bar{x}(\lambda) + 15\bar{y}(\lambda) + 3\bar{z}(\lambda)}$$

where $\bar{x}(\lambda)$, $\bar{y}(\lambda)$, $\bar{z}(\lambda)$ are the CIE color matching functions for the 2-degree observer.

If the vector is determined to lie outside the locus 422, then the mapped color value's chromaticity value is taken at a point on the locus that is the intersection of the locus and a line segment defined by the vector and white point 424. If clipping has occurred, the color value's u and v value are reconstructed by first subtracting $u_n'$ and $v_n'$ from the clipped u' and v' values, then multiplying by 13 L. The color value clipping process then ends 426.

In a preferred embodiment, the CIE spectral locus in the u'v' plane is defined in CIE 15.2-1986 and represented by a piecewise linear curve with 35 line segments (corresponding to wavelengths from 360 nm to 700 nm inclusive). By ordering the line segments so that their subtended angles at the white point are ascending (which turns out to be equivalent to descending wavelengths), the spectral locus line segment that intersects with the ray formed by the above vector may be found by a binary search.

Figure 5:
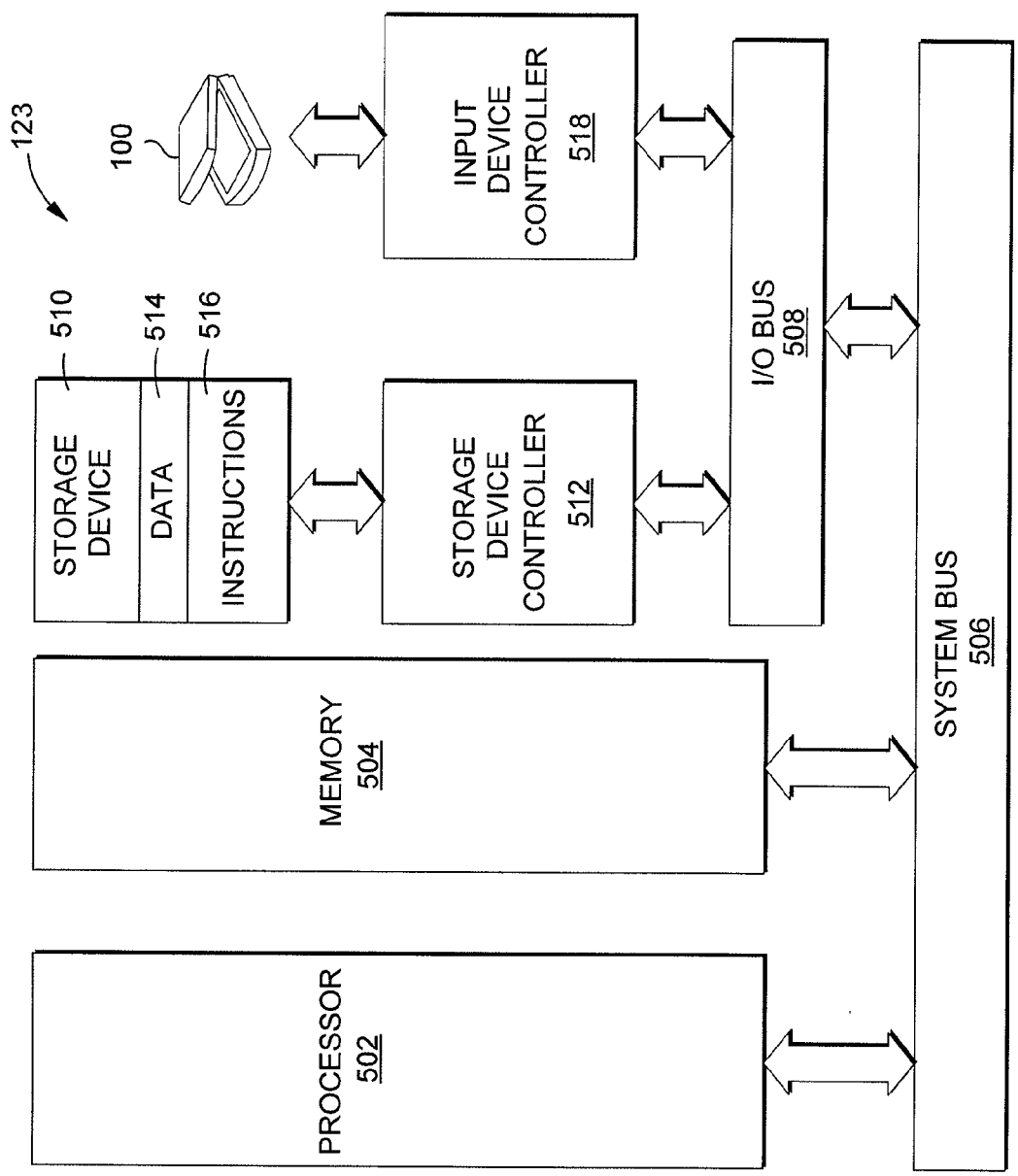
FIG. 5 is a block diagram of a data processing apparatus that may be used to generate a forward model in accordance with the present invention.

FIG. 5 is a block diagram of a data processing system that may be used to correct the output of a forward model. The data processing system 108 includes a processor 502 coupled to a memory 504 via system bus 506. The processor is also coupled to external Input/Output (I/O) devices via the system bus and an I/O bus 508. A storage device having data processing system or computer readable media 510 is coupled to the processor via a storage device controller 512 and the I/O bus and the system bus. The storage device is used by the processor to store and read data 514 and program instructions 516 used to implement the forward model correction method as described above. The processor may be further coupled to an input device, such as a color input device 100, via an input device controller 518 coupled to the I/O bus.

In operation, the processor loads the program instructions from the storage device into the memory. The processor executes the loaded program instructions to receive device dependent color values from the color input device. The processor then executes the program instructions to correct a forward model used to map the device dependent color value to a device independent color value for the color input device as described above.

The present invention has been described above with respect to particular illustrative embodiments. It is understood that the present invention is not limited to the above-described embodiments and that various changes and modifications may be made by those skilled in the relevant art without departing from the spirit and scope of the invention.

What is claimed is:

1. A method of transforming device-dependent color values in a device-dependent color space of a color input device to device-independent color values inside a human visual gamut in a device-independent color space, comprising the steps of:
   providing a mathematical model for converting device-dependent color values in a device-dependent color space of the color input device to device-independent color values in the device-independent color space;
   converting an input device-dependent color value in the device-dependent color space generated by the color input device into a device-independent color value in the device-independent color space using the mathematical model;
   determining, using a processor, whether or not the device-independent color value has a luminance component less than zero;
   when it is determined that the luminance component is less than zero, performing the following steps:
      clipping the luminance component to zero; and
      setting chromaticity components of the device-independent color value to zero; and
   when it is determined that the luminance component is not less than zero, performing the following steps:
      determining whether or not the device-independent color value is outside the human visual gamut in the device-independent color space; and
      when it is determined that the device-independent color value is outside the human visual gamut, clipping the device-independent color value to another device-independent color value in the device-independent color space on a boundary of the human visual gamut
      wherein the boundary of the human visual gamut corresponds to the CIE spectral locus on a chromaticity space.

2. The method according to claim 1, wherein the luminance component of the device-independent color value is not clipped at an upper bound in the clipping wherein the luminance component of the device-independent color value is allowed to take a value higher than a diffuse white point of the device-independent color space.

3. The method of claim 1, wherein clipping the device-independent color value further comprises mapping the device-independent color value outside the human visual gamut to an intersection between a line defined by the device-independent color value and a white point and a boundary of the human visual gamut.

4. The method of claim 1, wherein the chromaticity space is the CIE chromaticity xy plane.

5. The method of claim 1, wherein the chromaticity space is the CIE Uniform Chromaticity Scale (UCS) u'v' plane.

6. The method of claim 1, wherein the device-independent color space is CIEXYZ.

7. The method of claim 1, wherein the device-independent color space is CIELUV.

8. The method of claim 1, wherein the device-independent color space is CIELAB.

9. A data processing system for transforming device-dependent color values in a device-dependent color space of a color input device to device-independent color values inside a human visual gamut in a device-independent color space, comprising:
   a processor;
   a memory coupled to the processor, the memory having program instructions executable by the processor stored therein, the program instructions comprising:
   providing a mathematical model for converting device-dependent color values in a device-dependent color space of the color input device to device-independent color values in the device-independent color space;
   converting an input device-dependent color value in the device-dependent color space generated by the color input device into a device-independent color value in the device-independent color space using the mathematical model;
   determining whether or not the device-independent color value has a luminance component less than zero;
   when it is determined that the luminance component is less than zero, performing the following steps:
      clipping the luminance component to zero; and
      setting chromaticity components of the device-independent color value to zero; and
   when it is determined that the luminance component is not less than zero, performing the following steps:
      determining whether or not the device-independent color value is outside the human visual gamut in the device-independent color space; and
      when it is determined that the device-independent color value is outside the human visual gamut, clipping the device-independent color value to another device-independent color value in the device-independent color space on a boundary of the human visual gamut
      wherein the boundary of the human visual gamut corresponds to the CIE spectral locus on a chromaticity space.

10. The data processing system of claim 9, wherein the luminance component of the device-independent color value is not clipped at an upper bound in the clipping wherein the luminance component of the device-independent color value is allowed to take a value higher than a diffuse white point of the device-independent color space.

11. The data processing system of claim 9, wherein clipping the device-independent color value further comprises mapping the device-independent color value outside the human visual gamut to an intersection between a line defined by the device-independent color value and a white point and a boundary of the human visual gamut.

12. The data processing system of claim 9, wherein the chromaticity space is the CIE chromaticity xy plane.

13. The data processing system of claim 9, wherein the chromaticity space is the CIE Uniform Chromaticity Scale (DCS) u'v' plane.

14. The data processing system of claim 9, wherein the device-independent color space is CIEXYZ.

15. The data processing system of claim 9, wherein the device-independent the color space is CIELUV.

16. The data processing system of claim 9, wherein the device-independent color space is CIELAB.

17. A computer-readable medium having program instructions for transforming device-dependent color values in a device-dependent color space of a color input device to device-independent color values inside a human visual gamut in a device-independent color space, the program instructions comprising the steps of:

providing a mathematical model for converting device-dependent color values in a device-dependent color space of the color input device to device-independent color values in the device-independent color space;

converting an input device-dependent color value in the device-dependent color space generated by the color input device into a device-independent color value in the device-independent color space using the mathematical model;

determining whether or not the device-independent color value has a luminance component less than zero;

when it is determined that the luminance component is less than zero, performing the following steps:

clipping the luminance component to zero; and setting chromaticity components of the device-independent color value to zero; and when it is determined that the luminance component is not less than zero, performing the following steps:

determining whether or not the device-independent color value is outside the human visual gamut in the device-independent color space; and when it is determined that the device-independent color value is outside the human visual gamut, clipping the device-independent color value to another device-independent color value in the device-independent color space on a boundary of the human visual gamut wherein the boundary of the human visual gamut corresponds to the CIE spectral locus on a chromaticity space.

18. The computer-readable medium of claim 17, wherein the luminance component of the device-independent color value is not clipped at an upper bound in the clipping wherein the luminance component of the device-independent color value is allowed to take a value higher than a diffuse white point of the device-independent color space.

19. The computer-readable medium of claim 18, wherein clipping the device-independent color value further comprises mapping the device-independent color value outside the human visual gamut to an intersection between a line defined by the device-independent color value and a white point and a boundary of the human visual gamut.

20. The computer-readable medium of claim 19, wherein the chromaticity space is the CIE chromaticity xy plane.

21. The computer-readable medium of claim 19, wherein the chromaticity space is the CIE Uniform Chromaticity Scale (UCS) u'v' plane.

22. The computer-readable medium of claim 17, wherein the device-independent color space is CIEXYZ.

23. The computer-readable medium of claim 17, wherein the device-independent color space is CIELUV.

24. The computer-readable medium of claim 17, wherein the device-independent color space is CIELAB.

* * * * *